United States Patent
McLain

(10) Patent No.: US 7,198,038 B2
(45) Date of Patent: Apr. 3, 2007

(54) LEARNED EGR VALVE POSITION CONTROL

(75) Inventor: Kurt D. McLain, Clarkston, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 0 days.

(21) Appl. No.: 11/208,434

(22) Filed: Aug. 19, 2005

(65) Prior Publication Data

US 2007/0043498 A1 Feb. 22, 2007

(51) Int. Cl.
*F02M 25/07* (2006.01)
*F02B 47/08* (2006.01)

(52) U.S. Cl. .................................. 123/568.21

(58) Field of Classification Search ........... 123/568.21, 123/568.11, 568.16
See application file for complete search history.

(56) References Cited

U.S. PATENT DOCUMENTS

| | | | |
|---|---|---|---|
| 6,142,119 A * | 11/2000 | Abe et al. ................... | 123/435 |
| 6,640,791 B2 * | 11/2003 | Itoi et al. ................. | 123/568.23 |
| 6,980,903 B2 * | 12/2005 | Daniels et al. .............. | 701/108 |
| 7,013,871 B2 * | 3/2006 | Zhu et al. .............. | 123/406.21 |
| 7,021,287 B2 * | 4/2006 | Zhu et al. .................... | 123/435 |
| 2005/0126537 A1 * | 6/2005 | Daniels et al. ......... | 123/406.14 |
| 2006/0102148 A1 * | 5/2006 | Nakazawa et al. .......... | 123/436 |

* cited by examiner

*Primary Examiner*—Hai Huynh
(74) *Attorney, Agent, or Firm*—Christopher DeVries

(57) ABSTRACT

An exhaust gas recirculation (EGR) valve positioning system according to the present invention includes an actuate valve module, an EGR valve position module, and an adjust control variables module. The actuate valve module selectively uses learned and default variables as control variables to position an EGR valve. The EGR valve position module determines whether the EGR valve is positioned in a target position. The adjust control variables module communicates with the actuate valve module and the EGR valve position module and adjusts the learned variables when the EGR valve position module determines that the EGR valve is positioned out of the target position.

17 Claims, 3 Drawing Sheets

LEARNED EGR VALVE POSITION CONTROL

FIELD OF THE INVENTION

The present invention relates to exhaust gas recirculation (EGR) systems for internal combustion engines, and more particularly a control system and method for positioning an EGR valve during a flow restriction test for an EGR system.

BACKGROUND OF THE INVENTION

Internal combustion engines combust an air and fuel mixture within cylinders to reciprocally drive pistons. The pistons rotatably drive a crankshaft to provide drive torque to a powertrain. Exhaust generated by the combustion process is exhausted from the engine through an exhaust manifold and treated by an exhaust system.

Engine systems often include an exhaust gas recirculation (EGR) system to reduce engine emissions. EGR systems re-circulate exhaust gases back into the cylinders, which tends to limit the amount of oxygen available for combustion. Limiting the oxygen available for combustion lowers combustion temperatures and reduces engine emissions. EGR systems can also improve fuel economy and/or performance when spark timing and fuel injection are optimized along with the operation of the EGR system. Debris build-up within the EGR system restricts the flow of exhaust and minimizes the effectiveness of the EGR system. Thus, an EGR diagnostic test may be performed to determine when EGR flow is restricted.

The EGR diagnostic test compares a maximum manifold absolute pressure (MAP) when the EGR valve is open to a maximum MAP when the EGR valve is closed. The diagnostic test uses the maximum MAP difference as an indication of EGR flow. This method requires positioning the EGR valve in open and closed positions.

During operation of the engine, operating characteristics of the EGR valve are affected by temperature changes. Each time the EGR diagnostic test is performed, the EGR valve must locate a new target position. The new target position is determined by starting from an initial position and working towards a position that allows a desired flow through the EGR valve. Attempting to locate the new target position can create excessive variations in EGR flow, which increases emissions. Furthermore, the current positioning method is difficult to calibrate due to the differing EGR valve characteristics during operation of the engine.

SUMMARY OF THE INVENTION

An exhaust gas recirculation (EGR) valve positioning system according to the present invention includes an actuate valve module, an EGR valve position module, and an adjust control variables module. The actuate valve module selectively uses learned and default variables as control variables to position an EGR valve. The EGR valve position module determines whether the EGR valve is positioned in a target position. The adjust control variables module communicates with the actuate valve module and the EGR valve position module and adjusts the learned variables when the EGR valve position module determines that the EGR valve is positioned out of the target position.

In other features, the EGR valve positioning system uses the default variables when the EGR valve positioning system is running for a first time. Learned variables are used by the EGR valve positioning system when the EGR valve is running after the first time. The learned variables are stored when the EGR valve positioning module determines that the EGR valve is positioned in the target position.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

Figure 1:
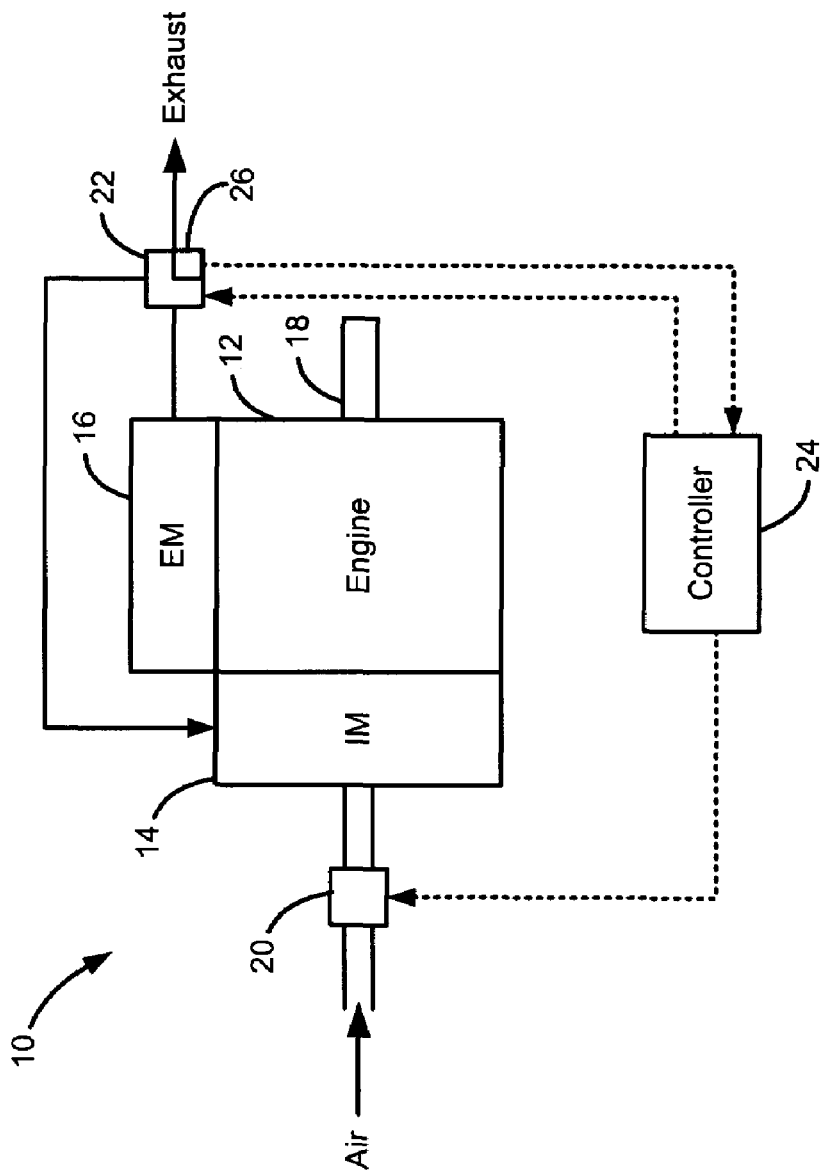
FIG. 1 is a functional block diagram of an exemplary engine system including an EGR valve.

The following description of the preferred embodiment is merely exemplary in nature and is in no way intended to limit the invention, its application, or uses. For purposes of clarity, the same reference numbers will be used in the drawings to identify similar elements. As used herein, the term module refers to an application specific integrated circuit (ASIC), an electronic circuit, a processor (shared, dedicated, or group) and memory that execute one or more software or firmware programs, a combinational logic circuit, and/or other suitable components that provide the described functionality.

Referring now to FIG. 1, an exemplary engine system 10 is illustrated. The engine system 10 includes an engine 12, an intake manifold 14 and an exhaust manifold 16. The engine 12 combusts an air and fuel mixture within cylinders (not shown) to drive pistons (not shown) that rotatably drive a crankshaft 18. Air is drawn through a throttle 20 and into the intake manifold 14, which distributes air to the cylinders. Exhaust from the combustion process is pumped out of the cylinders and into the exhaust manifold 16. The exhaust is treated in an exhaust system (not shown) and is released to atmosphere.

The engine system 10 further includes an exhaust gas recirculation (EGR) valve 22. The EGR valve 22 is selectively actuated to re-direct a portion of the exhaust gas back into the intake manifold 14. The EGR valve 22 operates in EGR ON and EGR OFF modes. In the EGR OFF mode, the EGR valve 22 is closed and no exhaust gas is circulated back into the intake manifold 14. In the EGR ON mode, the EGR valve 22 is open and a portion of the exhaust gas is circulated back into the intake manifold 14.

A controller 24 regulates engine operation and provides EGR flow restriction control including the positioning of the EGR valve 22. An EGR valve position sensor 26 is responsive to the position of the EGR valve 22 and generates a position signal based thereon. As discussed in detail below, the controller 24 receives the position signal and positions the EGR valve 22 based thereon.

Figure 2:
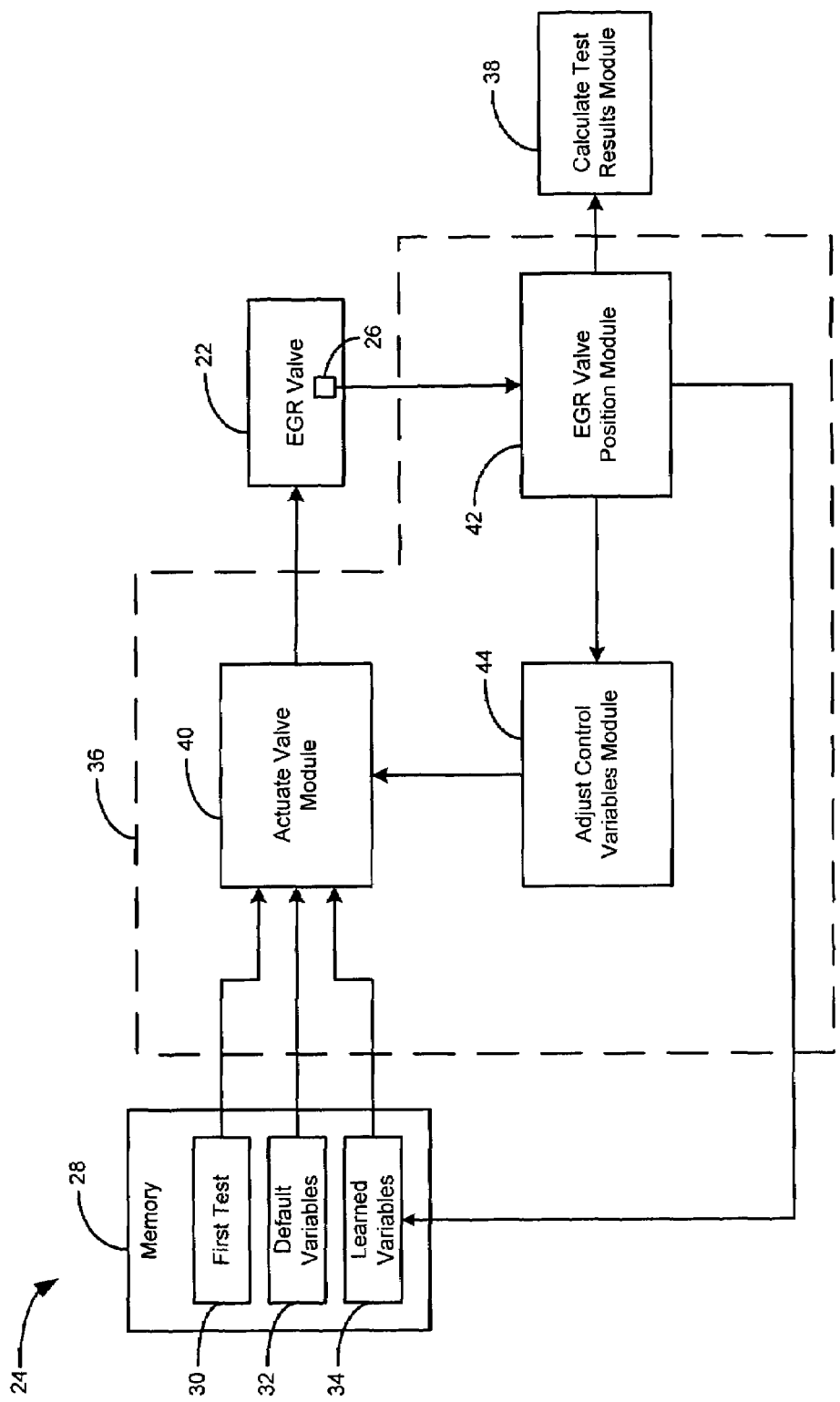
FIG. 2 is a functional block diagram of an EGR valve positioning system according to the present invention.

Referring now to FIG. 2, the controller 24 includes memory 28 that stores information such as whether the EGR valve 22 has been positioned for a first test 30, a set of default control variables 32, and a set of learned control variables 34 that are determined. The first test 30 information signifies whether the EGR valve 22 has been positioned since a clear code event. Clear code events include, but are not limited to, a loss of power or a service reset. The controller 24 also includes an EGR valve positioning system 36 that positions the EGR valve 22 using the first test 30, the set of default control variables 32, and the set of learned control variables 34 stored in memory 28. In addition, the controller 24 includes a calculate test results module 38 that determines flow restriction in the EGR valve 22.

The EGR valve positioning system 36 includes an actuate valve module 40 that reads the first test 30 information from memory 28 and determines whether the current cycle is a first cycle since a code clear event. If it is the first cycle since a code clear event, the actuate valve module 40 uses the set of default control variables 32 as control variables to position the EGR valve 22. If the actuate valve module 40 determines that the current cycle is not the first cycle since a clear code event, then the actuate valve module 40 uses the set of learned control variables 34 as control variables to position the EGR valve 22. In a preferred embodiment, the control variables include a magnitude of current and a time period in which the magnitude of current is provided.

While the EGR valve 22 is actuated, an EGR valve position module 42 periodically communicates with the EGR valve position sensor 26 and determines whether the EGR valve 22 is positioned in a target position. The target position is a position that allows a desired flow through the EGR valve 22. When the EGR valve position module 42 determines that the EGR valve 22 is not in the target position, an adjust control variables module 44 is enabled to adjust the set of learned control variables 34 and the process returns to the actuate valve module 40 for another cycle. However, if the EGR valve position module 42 determines that the EGR valve 22 is in the target position, the calculate test results module 38 is enabled to calculate the flow of exhaust through the EGR valve 22 and the set of learned control variables 34 are stored in memory 28 for the next cycle.

Figure 3:
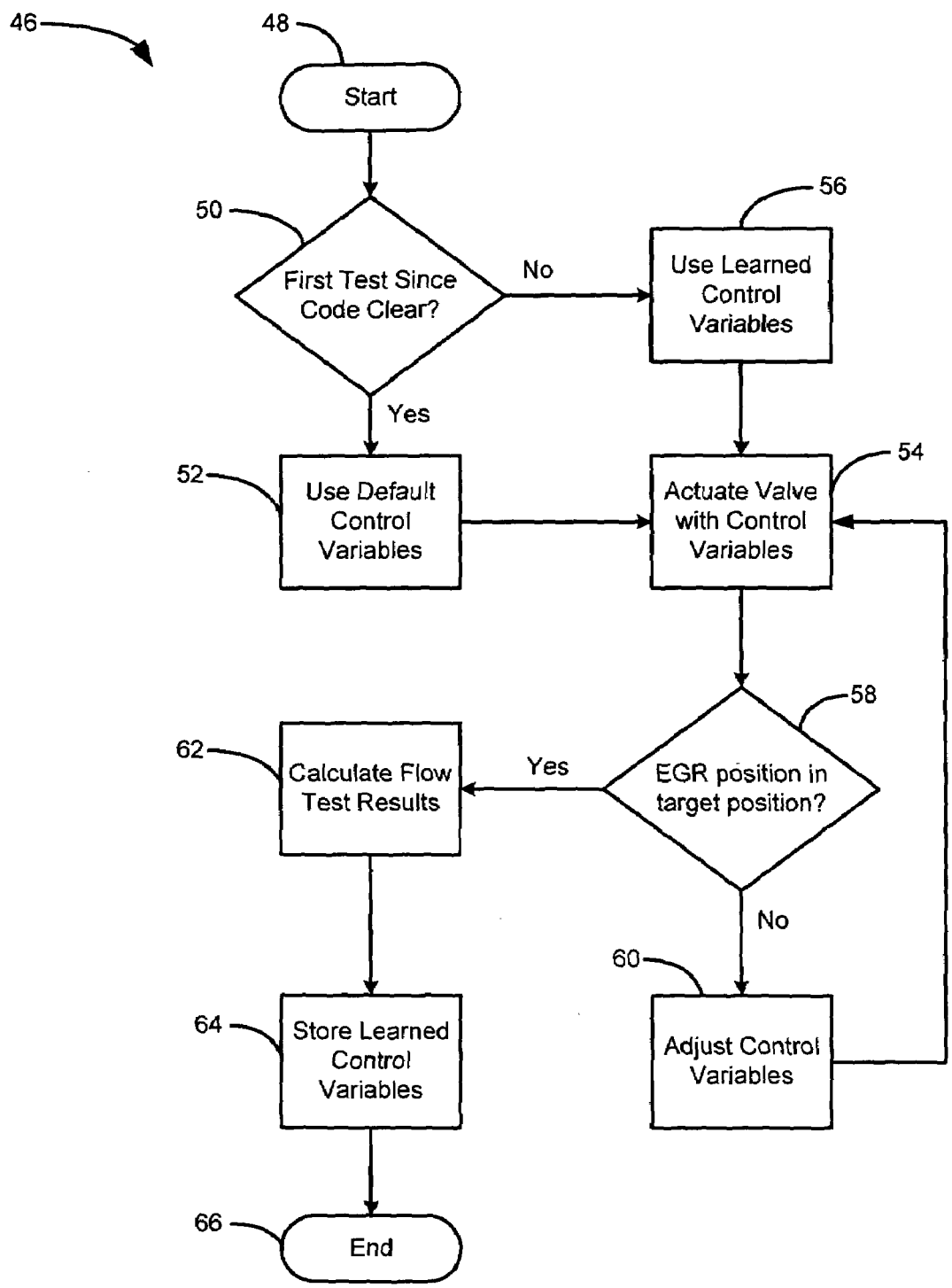
FIG. 3 is a flowchart illustrating exemplary steps executed by the EGR valve positioning system according to the present invention.

Referring now to FIG. 3, the EGR valve positioning system 36 implements a method generally identified at 46 to control the position of the EGR valve 22. The method 46 starts at step 48 when an EGR flow test begins. The EGR flow test begins when enable conditions have been met. Exemplary enable conditions include, but are not limited to, deceleration, throttle closed and engine revolutions within a predetermined range. In step 50, the EGR valve positioning system 36 determines whether the current cycle is the first cycle since a clear code event. If true, the EGR valve positioning system 36 uses the set of default control variables 32 as control variables in step 52 to actuate the EGR valve 22 in step 54. If false, the EGR valve positioning system 36 uses the set of learned control variables 34 from the last cycle as control variables in step 56 to actuate the EGR valve 22 in step 54.

Once the EGR valve 22 has been actuated, control in step 58 determines whether the EGR valve 22 is in the target position. If the EGR valve 22 is not in the target position, the set of learned control variables 34 are adjusted in step 60 and the cycle returns to step 54. Once the EGR valve 22 is in the target position, the flow test results are calculated in step 62, the set of learned control variables 34 are stored in step 64, and the process ends in step 66.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, the specification and the following claims.

What is claimed is:

1. An exhaust gas recirculation (EGR) valve positioning system, comprising:
   an actuate valve module that selectively uses learned and default variables as control variables to position an EGR valve;
   an EGR valve position module that determines whether said EGR valve is positioned in a target position based on a position sensor signal; and
   an adjust control variables module that communicates with said actuate valve module and said EGR valve position module and that adjusts said learned variables when said EGR valve position module determines that said EGR valve is positioned out of said target position.

2. The EGR valve positioning system of claim 1 wherein said default variables are used as said control variables when said EGR valve positioning system is running for a first time.

3. The EGR valve positioning system of claim 2 wherein said learned variables are used as said control variables when said EGR valve positioning system is running after said first time.

4. The EGR valve positioning system of claim 3 wherein said learned variables are stored when said EGR valve positioning module determines that said EGR valve is positioned in said target position.

5. The EGR valve positioning system of claim 4 further comprising an EGR valve position sensor that communicates the position of said EGR valve to said EGR valve position module.

6. The EGR valve positioning system of claim 1 wherein said learned variables are adjusted by incrementally moving said EGR valve toward said target position.

7. The EGR valve positioning system of claim 1 wherein said control variables comprise a magnitude of current and a period of time in which said magnitude of current is provided.

8. A method of positioning an exhaust gas recirculation (EGR) valve, comprising:
   selectively using learned and default variables as control variables to position the EGR valve;
   determining whether the position of the EGR valve is in a target position based on a position sensor signal; and
   adjusting said learned variables when the EGR valve is positioned out of said target position.

9. The method of claim 8 wherein said default variables are used as said control variables when the EGR valve is positioned for a first time.

10. The method of claim 9 wherein said learned variables are used as said control variables when the EGR valve is positioned after said first time.

11. The method of claim 10 wherein said learned variables are stored when the EGR valve is positioned in said target position.

12. The method of claim 8 wherein said learned variables are adjusted by incrementally moving the EGR valve toward said target position.

13. A method of positioning an exhaust gas recirculation (EGR) valve during a flow restriction test comprising:

determining whether conditions have been met to enable the flow restriction test;
selectively using learned and default variables as control variables to position the EGR valve if said conditions have been met to enable the flow restriction test;
determining whether the position of the EGR valve is in a target position based on a position sensor signal; and
adjusting said learned variables when the EGR valve is positioned out of said target position.

14. The method of claim 13 wherein said default variables are used as said control variables when the EGR valve is positioned for a first time.

15. The method of claim 14 wherein said learned variables are used as said control variables when the EGR valve is positioned after said first time.

16. The method of claim 15 wherein said learned variables are stored when the EGR valve is positioned in said target position.

17. The method of claim 13 wherein said learned variables are adjusted by incrementally moving the EGR valve toward said target position.

* * * * *